United States Patent
Morgan et al.

(10) Patent No.: US 12,380,488 B2
(45) Date of Patent: Aug. 5, 2025

(54) SYSTEM AND METHOD FOR PROVIDING LARGE BASKET VISION CHECKOUT

(71) Applicant: NCR Voyix Corporation, Atlanta, GA (US)

(72) Inventors: Kip Morgan, Atlanta, GA (US); Gina Torcivia Bennett, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 255 days.

(21) Appl. No.: 18/216,789

(22) Filed: Jun. 30, 2023

(65) Prior Publication Data

US 2025/0005651 A1    Jan. 2, 2025

(51) Int. Cl.
| | | |
|---|---|---|
| *G06Q 30/0601* | (2023.01) | |
| *G06Q 20/20* | (2012.01) | |
| *G06V 20/50* | (2022.01) | |

(52) U.S. Cl.
CPC ....... *G06Q 30/0637* (2013.01); *G06Q 20/208* (2013.01); *G06V 20/50* (2022.01)

(58) Field of Classification Search
CPC .. G06Q 30/0637; G06Q 20/208; G06Q 20/42; G06Q 20/18; G06Q 30/0633; G06V 20/50; G07G 1/0018; G07G 1/0063; G07G 1/0009; G07G 1/0036; G07G 1/01
See application file for complete search history.

(56) References Cited

U.S. PATENT DOCUMENTS

| | | | |
|---|---|---|---|
| 7,909,248 B1 * | 3/2011 | Goncalves | G07G 1/0072 235/462.14 |
| 11,170,186 B2 * | 11/2021 | Lee | G06Q 20/18 |
| 11,238,425 B2 | 2/2022 | Chandran | |
| 11,409,977 B1 * | 8/2022 | Glaser | G06K 7/10722 |
| 11,481,751 B1 * | 10/2022 | Chaubard | G06V 10/82 |
| 2010/0158310 A1 * | 6/2010 | McQueen | G06Q 10/087 348/E5.022 |
| 2011/0215147 A1 * | 9/2011 | Goncalves | G07G 3/006 235/383 |
| 2013/0001295 A1 * | 1/2013 | Goncalves | G07G 1/0072 235/375 |

(Continued)

FOREIGN PATENT DOCUMENTS

| | | | | |
|---|---|---|---|---|
| CA | 3117141 A1 * | 4/2020 | | G06F 18/214 |
| WO | WO-2010075131 A2 * | 7/2010 | | A47F 9/046 |

*Primary Examiner* — Ashford S Hayles
(74) *Attorney, Agent, or Firm* — Notaro, Michalos & Zaccaria P.C.; John S. Economou

(57) ABSTRACT

A self-service checkout system has a processor and a non-transitory computer-readable storage medium storing executable instructions. The executable instructions, when executed by the processor, cause the processor to perform operations including: receiving a message from a vision system that includes a current list of identified items on a tray positioned adjacent to the vision system for a current transaction, comparing the current list of identified items to a previous list of identified items, and adding any items on the current list that are not on the previous list to a transaction list for a current transaction, determining that the current transaction is complete when the current list of identified items has no items, enabling a customer to review the transaction list and remove any duplicate entries, and completing the current transaction.

20 Claims, 3 Drawing Sheets

(56) References Cited

U.S. PATENT DOCUMENTS

| | | | | |
|---|---|---|---|---|
| 2013/0054395 A1* | 2/2013 | Cyr | ............... | G06Q 20/3223 |
| | | | | 705/21 |
| 2014/0021258 A1* | 1/2014 | Olmstead | ........... | G06K 7/10544 |
| | | | | 235/462.41 |
| 2018/0189763 A1* | 7/2018 | Olmstead | ............... | G06V 10/42 |
| 2019/0371134 A1* | 12/2019 | Chen | ............... | G06V 40/103 |
| 2020/0104565 A1 | 4/2020 | Zucker et al. | | |
| 2020/0334650 A1* | 10/2020 | Song | ............... | G06K 7/1491 |
| 2021/0401192 A1* | 12/2021 | Yang | ............... | G06V 10/40 |
| 2022/0383383 A1* | 12/2022 | Xiao | ............... | G06Q 20/0457 |
| 2023/0077198 A1* | 3/2023 | Yepez | ............... | G06Q 20/3224 |
| 2023/0095037 A1* | 3/2023 | Slaughter | ............... | G06N 20/10 |
| | | | | 705/23 |
| 2023/0102876 A1* | 3/2023 | Atallah | ............... | G06Q 20/208 |
| | | | | 382/159 |
| 2023/0245535 A1* | 8/2023 | Xiao | ............... | G06V 20/52 |
| | | | | 382/103 |
| 2023/0368625 A1* | 11/2023 | Sanil | ............... | G07G 3/003 |

\* cited by examiner

SYSTEM AND METHOD FOR PROVIDING LARGE BASKET VISION CHECKOUT

FIELD

This disclosure relates generally to a system and method for providing large basket vision checkout, and more particularly to a system and method for providing large basket vision checkout that enhances vision-based checkout systems which can only process one basket or tray at a time.

BACKGROUND

A vision system for use with a self-service checkout terminal is a technology that incorporates computer vision and image processing techniques to enable automated product recognition, item tracking, and transaction handling in a self-checkout environment. The vision system uses cameras and specialized software to capture, analyze, and interpret visual information from the items being scanned by customers. The vision system interfaces with software in the self-checkout terminal to relay the recognized items, quantities, and prices. The vision system must be coupled via an interface to the point-of-sale (POS) system in the self-service checkout terminal and automates the transaction process by sending the item details for pricing, discounts, and payment processing. By leveraging a vision system, self-service checkout terminals provide a more efficient and streamlined experience for customers, reduce reliance on manual intervention, minimize errors, and improve overall accuracy and convenience during the checkout process. However, such vision systems are limited by being able to only process a single basket or tray at a time.

The present disclosure describes an improvement to existing vision-based self-service checkout terminals that allows processing of larger baskets that include more items than can fit on a single tray associated with a vision system/self-service checkout terminal.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

A conventional point-of-sale (POS) terminal may include a web server for receiving external communications by way of a Hypertext Transfer Protocol (HTTP) PUT message from a mobile shopper (via an application or mobile device) in order to complete a transaction. A PUT message is a type of HTTP request method used to send data from a client (such as a web browser or an application) to a web server and is commonly used for submitting data to be processed and stored on the server. When making a HTTP PUT request, the client sends a message to the server that includes an HTTP header and a message body. The header may contain information such as the HTTP method (PUT), the URL of the server endpoint, and additional metadata about the request. The message body contains the data that needs to be sent to the server. The message body can be formatted as an Extensible Markup Language (XML) file (according to an XML schema) message pushed to the web server via an HTTP PUT message.

Figure 1:
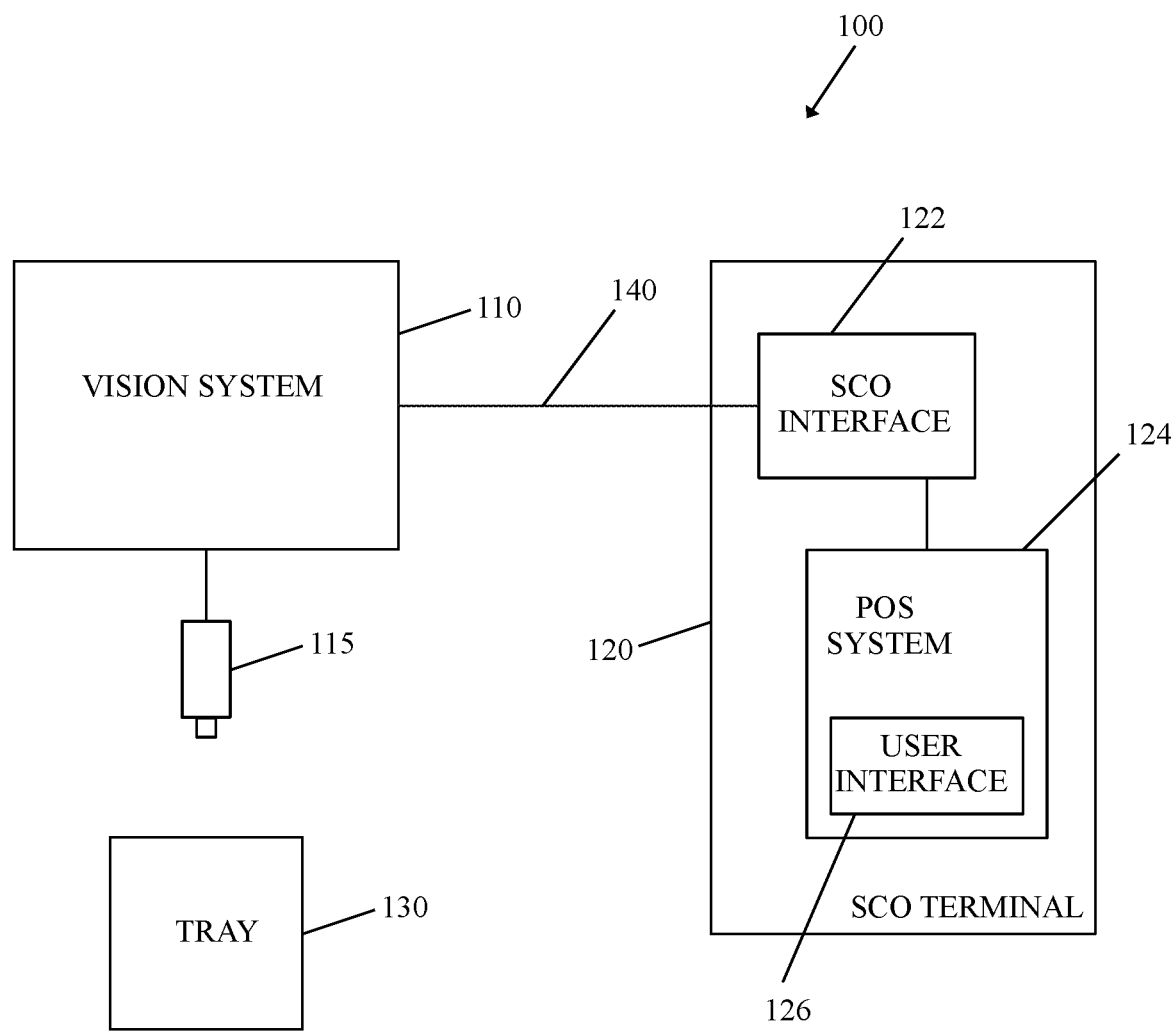
FIG. 1 is block diagram of a system incorporating a vision system into a self-service checkout system according to the present disclosure.

Referring now to FIG. 1, a system 100 for vision-based checkout includes a vision system 110 that has one or more (typically several) cameras 115 focused on a tray 130. The vision system 110 processes the information received from cameras 115 in order to identify all products that have been placed on the tray 130. The vision system 110 is coupled to a self-checkout terminal 120 via a communications link 140 such as a local area network. The self-checkout terminal 120 includes a self-checkout interface 122 that is coupled to a POS system 124, which includes a user interface 126. The self-checkout interface 122 may be coupled to the communications link for receiving messages from clients such as the vision system 110. The self-checkout interface 122 may include a web server and the messages may be formatted as HTTP PUT requests. The user interface 126 may be, for example, a separate touch screen or a display with an associated keypad. The vision system 110 is a computer-based system that may use an architecture like the computing device shown in FIG. 6 and described below. The vision system 110 may output messages via a custom or proprietary API or in text-based form, e.g., formatted as an HTTP PUT message. Each message output by the vision system 110 includes information about all of the products that have been identified on the tray 130 and is sent every time a change of status at the tray is detected.

The vision system 110 is a stateless system that provides a message indicating what items are currently in view on the tray 130. The POS system 124 uses the message from the vision system 110 to determine what items to add to the ticket (current transaction). Previously, when an item was removed from the tray 130 (i.e., the camera view), the item was voided from the ticket based on an assumption that it was not wanted. The system and method of the present disclosure allows more than one full tray of items to be sold by eliminating the automatic voiding of items removed from the tray. To know what items are to be added to the current ticket, the POS system 124 compares a previous list of items to a current list. If a new item (e.g., barcode) is detected in the current list, that item is added to the current ticket. If the item list is the same, no items are added to the current ticket. If an item has been removed, it is not removed from the sold ticket because it is assumed that the customer has just cleared the tray 130 to make room for more items. When an item is double-sold (duplicative) (i.e., listed twice on the current ticket when only one item is present), the customer is provided with a user interface before completing the transaction that allows the customer to remove the extra (duplicative) item without the need for intervention by an attendant. The possibility of a double-sold item is detected when more than one item having the same barcode is present on the current ticket. Previously, an attendant was required to intervene when an item needed to be deleted manually from the ticket. Now, no intervention is required because it is possible that items can be accidentally double sold. The present system and method improves upon existing vision checkout systems which are not able to sell large quantities of items (i.e., more than one tray of items).

The POS system 124 may be configured to convert to a conventional checkout terminal using a barcode scanner if no messages are received from the vision system 110 after a predetermined period of time. This ensures that POS system 124 does not go out of service when the vision system is not operating. Because the current system 100 operates on a push basis, where messages are received only when items change on the tray 130, an additional heartbeat field (tag) may also be added to the XML Schema. This allows the vision system 110 to send the push messages at predetermined intervals when no change occurs at the tray 130 to the SCO interface 122 with the heartbeat field set as active. When the heartbeat field is set as active, the POS system 124 keeps operating in conjunction with the vision system 110 but is instructed to ignore any image and item data within the current XML message.

Figure 2:
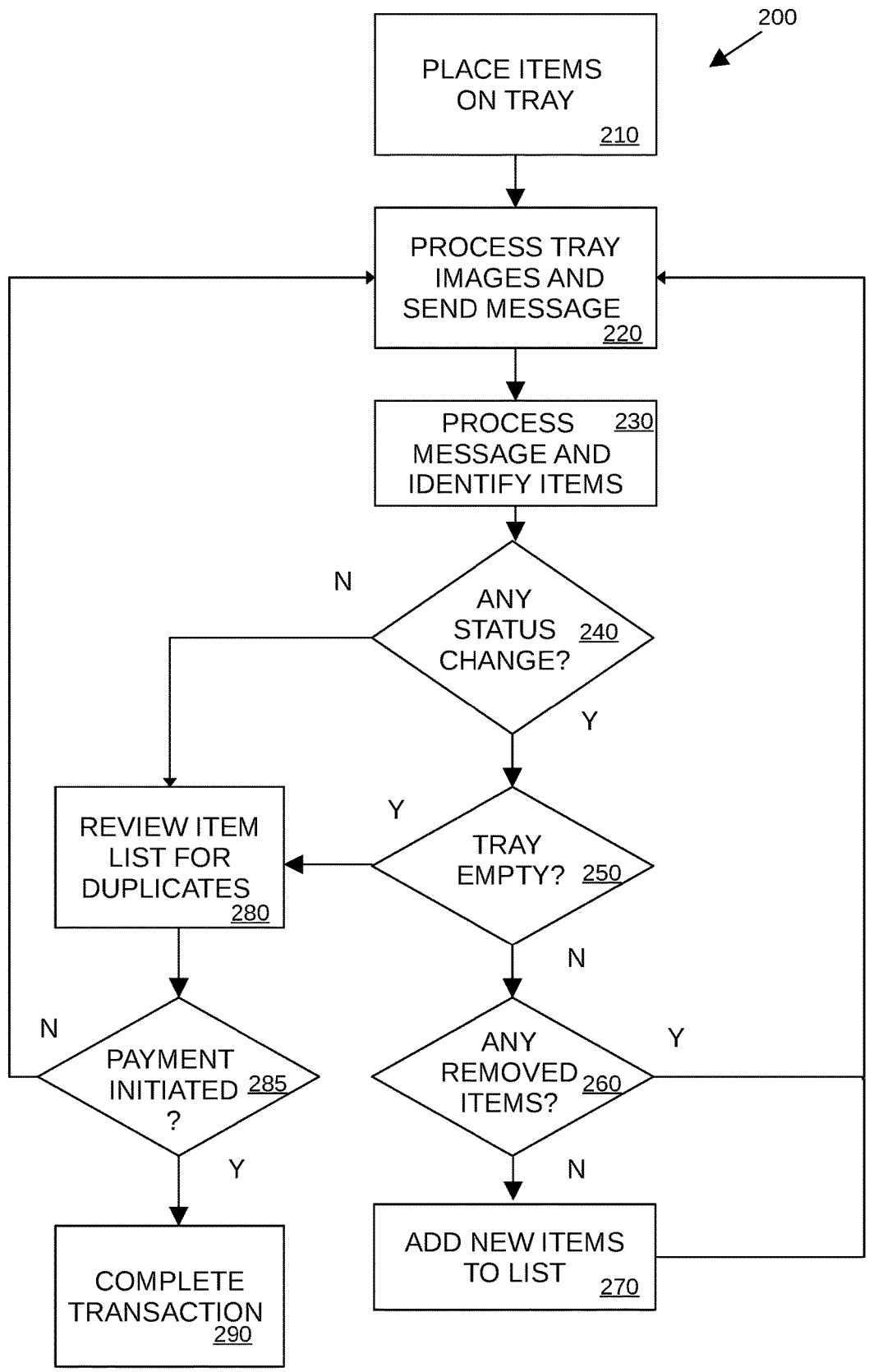
FIG. 2 is a flowchart showing the operation of the system incorporating the vision system into the self-service checkout system according to the present disclosure.

Referring now to the flowchart 200 in FIG. 2, according to an embodiment, a customer starts to place items on the tray 130 at step 210. The vision system 110 generates images of the tray using the cameras 115, processes the images to identify the items on the tray 130, and then forwards a message that lists the items identified on the tray to the SCO interface 122 at the self-service checkout terminal 120, at step 220. The message is forwarded to the POS system 124, which processes the message to identify the current list of items, at step 230. The POS system 124 compares the current list of items to a prior list (which is the null set for the first message in a current transaction) at step 240. If there is no status change (i.e., no difference between the current list and the previous list), processing moves to step 280, where the customer is provided with a user interface that displays the current item list. The customer may then review any item(s) for which more than one entry exists to determine if this was a system error (and/or for items inadvertently scanned or no longer desired) and may elect to reduce the number of a particular item to reflect the actual number of that item (or eliminate items inadvertently scanned or no longer desired) without the need for any intervention by an attendant. If no action is taken, processing then moves to step 285, where the customer may elect to initiate payment when no additional items are to be identified. If the customer does not elect to initiate payment, loops back to step 220 to continue the current transaction (so that additional items may be identified). If a status change is found at step 240, processing moves to step 250 where it is determined if the tray 130 is empty (meaning that the current list has no items). If the tray is empty, processing moves to step 280. If the tray is not empty, it is first determined at step 260 if the current list has less items than the previous list (meaning that an item has been removed). If this is the case, processing moves to step 220 to continue the current transaction and it is assumed that the removed item has been moved off the tray 130 to a bagging area. If there are no removed items, this means that there are added items and processing moves to step 270 where the newly added items are added to the list of items for the current transaction, and then processing loops back to step 220 to continue the current transaction (so that additional items may be identified). When the customer the customer initiates payment at step 285, processing proceeds to step 290, where the POS system 124 allows the customer to complete the transaction by, for example, presenting a final list of the items to be purchased and the total cost, and allowing the customer to make payment.

Figure 3:
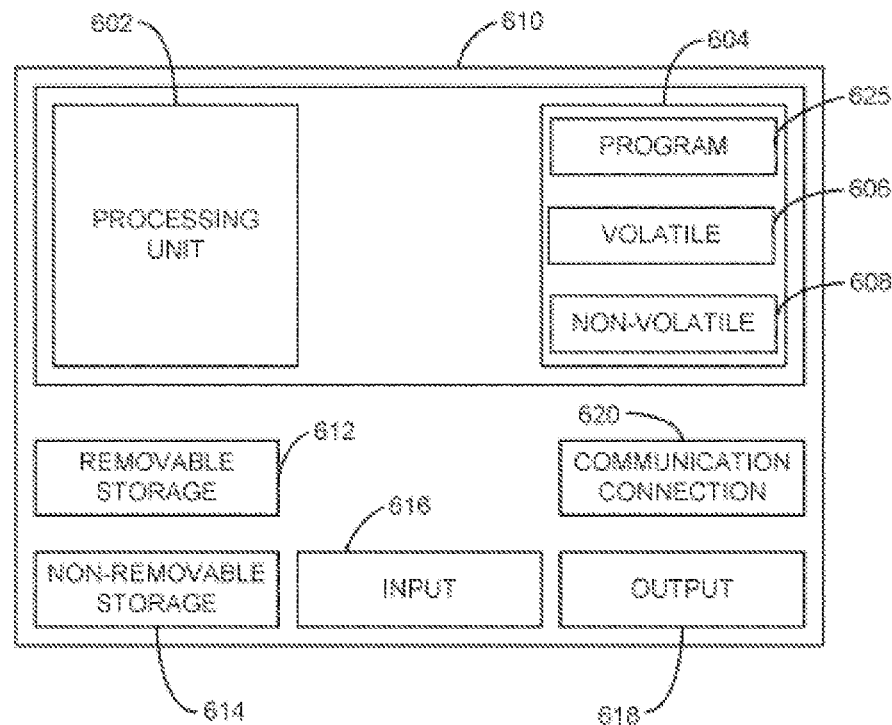
FIG. 3 is a block diagram of a computing system for use with the self-service checkout system according to the present disclosure.

FIG. 3 is a block diagram of a computing device according to an example embodiment for use in implementing the self-service checkout terminal or the vision system. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6 Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610. and other input devices. The computer 610 may operate in a networked environment using a communication connection 620 to connect to one or more remote computers, such as database servers, web servers, and other computing devices. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A self-service checkout system, comprising a processor and a non-transitory computer-readable storage medium comprising executable instructions, that when executed by the processor, cause the processor to perform operations comprising:
receiving a message from a vision system that includes a current list of identified items on a tray positioned adjacent to the vision system for a current transaction;
comparing the current list of identified items to a previous list of identified items, and adding any items on the current list that are not on the previous list to a transaction list for a current transaction;
determining that the current transaction is complete;
enabling a customer to review the transaction list to remove any duplicate entries; and
completing the current transaction.

2. The self-service checkout system of claim 1, wherein the executable instructions when executed by the processor cause the processor to perform the operation of comparing the current list of identified items to a previous list of identified items, and making no change to the transaction list when an item on the previous list has been removed from the current list.

3. The self-service checkout system of claim 1, wherein the executable instructions when executed by the processor cause the processor to perform the operation of comparing the current list of identified items to a previous list of identified items, and making no change to the transaction list when the items on the current list are the same as the items on the previous list.

4. The self-service checkout system of claim 1, further comprising a user interface via which the customer reviews the transaction list and removes any duplicate entries.

5. The self-service checkout system of claim 1, wherein receiving the message from the vision system comprises receiving the message via a communications link.

6. The self-service checkout system of claim 1, wherein the executable instructions when executed by the processor cause the processor to operate a webserver.

7. The self-service checkout system of claim 1, wherein the message is an HTTP PUT message.

8. The self-service checkout system of claim 1, wherein the message from the vision system is formatted using extensible markup language.

9. The self-service checkout system of claim 1, wherein the message from the vision system includes a heartbeat field that, when set as active, provides an indication that the vision system is active and that any other information in the message is to be ignored.

10. The self-service checkout system of claim 9, wherein the executable instructions when executed by the processor cause the processor to identify whether the heartbeat field in the message from the vision system is set as active.

11. A method, comprising:
receiving a message from a vision system that includes a current list of identified items on a tray positioned adjacent to the vision system for a current transaction;
comparing the current list of identified items to a previous list of identified items, and adding any items on the current list that are not on the previous list to a transaction list for a current transaction;
determining that the current transaction is complete;
enabling a customer to review the transaction list to remove any duplicate entries; and
completing the current transaction.

12. The method of claim 11, comprising comparing the current list of identified items to a previous list of identified items, and making no change to the transaction list when an item on the previous list has been removed from the current list.

13. The method of claim 1, comprising comparing the current list of identified items to a previous list of identified items, and making no change to the transaction list when the items on the current list are the same as the items on the previous list.

14. The method of claim 11, comprising providing a user interface via which the customer reviews the transaction list and removes any duplicate entries.

15. The method of claim 11, wherein receiving the message from the vision system comprises receiving the message via a communications link.

16. The method of claim 11, wherein the executable instructions when executed by the processor cause the processor to operate a webserver.

17. The method of claim 11, wherein the message is an HTTP PUT message.

18. The method of claim 11, wherein the message from the vision system is formatted using extensible markup language.

19. The method of claim 11, wherein the message from the vision system includes a heartbeat field that, when set as active, provides an indication that the vision system is active and that any other information in the message is to be ignored.

20. The method of claim 19, comprising identifying whether the heartbeat field in the message from the vision system is set as active.

* * * * *